(12) United States Patent
Carlström

(10) Patent No.: US 8,824,287 B2
(45) Date of Patent: Sep. 2, 2014

(54) METHOD AND APPARATUS FOR MANAGING TRAFFIC IN A NETWORK

(75) Inventor: Jakob Carlström, Uppsala (SE)

(73) Assignee: Marvell International Ltd., Hamilton (BM)

( * ) Notice: Subject to any disclaimer, the term of this patent is extended or adjusted under 35 U.S.C. 154(b) by 306 days.

(21) Appl. No.: 12/989,631

(22) PCT Filed: Apr. 21, 2009

(86) PCT No.: PCT/EP2009/054742
§ 371 (c)(1),
(2), (4) Date: Oct. 25, 2010

(87) PCT Pub. No.: WO2009/130218
PCT Pub. Date: Oct. 29, 2009

(65) Prior Publication Data
US 2011/0038261 A1    Feb. 17, 2011

Related U.S. Application Data

(60) Provisional application No. 61/047,681, filed on Apr. 24, 2008.

(51) Int. Cl.
*H04L 12/833* (2013.01)
*H04L 12/56* (2006.01)
*H04L 12/869* (2013.01)

(52) U.S. Cl.
CPC ........ *H04L 47/2458* (2013.01); *H04L 47/6215* (2013.01); *H04L 47/6275* (2013.01); *H04L 47/805* (2013.01); *H04L 47/29* (2013.01); *H04L 47/60* (2013.01); *H04L 47/522* (2013.01); *H04L 47/527* (2013.01); *H04L 47/821* (2013.01); *H04L 47/22* (2013.01); *H04L 49/3027* (2013.01)
USPC .......................... 370/230.1; 370/235; 370/236

(58) Field of Classification Search
None
See application file for complete search history.

(56) References Cited

U.S. PATENT DOCUMENTS

| | | | |
|---|---|---|---|
| 6,188,698 B1 | 2/2001 | Galand et al. | |
| 7,321,940 B1 * | 1/2008 | Smith et al. | 709/240 |
| 7,525,962 B2 * | 4/2009 | Kounavis et al. | 370/389 |
| 7,830,889 B1 * | 11/2010 | Lemaire et al. | 370/395.4 |
| 8,194,690 B1 * | 6/2012 | Steele et al. | 370/412 |
| 2002/0141427 A1 * | 10/2002 | McAlpine | 370/413 |

(Continued)

FOREIGN PATENT DOCUMENTS

CA    2302129    9/2000

*Primary Examiner* — Hanh N Nguyen
*Assistant Examiner* — Joshua A Kading

(57) ABSTRACT

The present invention relates to a traffic manager (1) and a method for a traffic manager (1), the method comprising the step of reading a first data packet ($D_1$-$D_D$) comprised in a first queue ($Q_1$-$Q_Q$) based on a scheduling priority (SP), the scheduling priority (SP) being determined: —at least partly on a configured priority of the first queue ($Q_1$-$Q_Q$), —at least partly on a first meter value ($MV_1$-$MV_M$) of a first meter (Mi-MM) associated with the first queue ($Q_1$-$Q_Q$); and—at least partly on a second meter value ($MV_1$-$MV_M$) of a second meter ($M_1$-$M_M$) associated with a first scheduling node ($N_1$-$N_N$); the first scheduling node being a parent node of the first queue.

16 Claims, 9 Drawing Sheets

(56) References Cited

U.S. PATENT DOCUMENTS

Figure 1A:
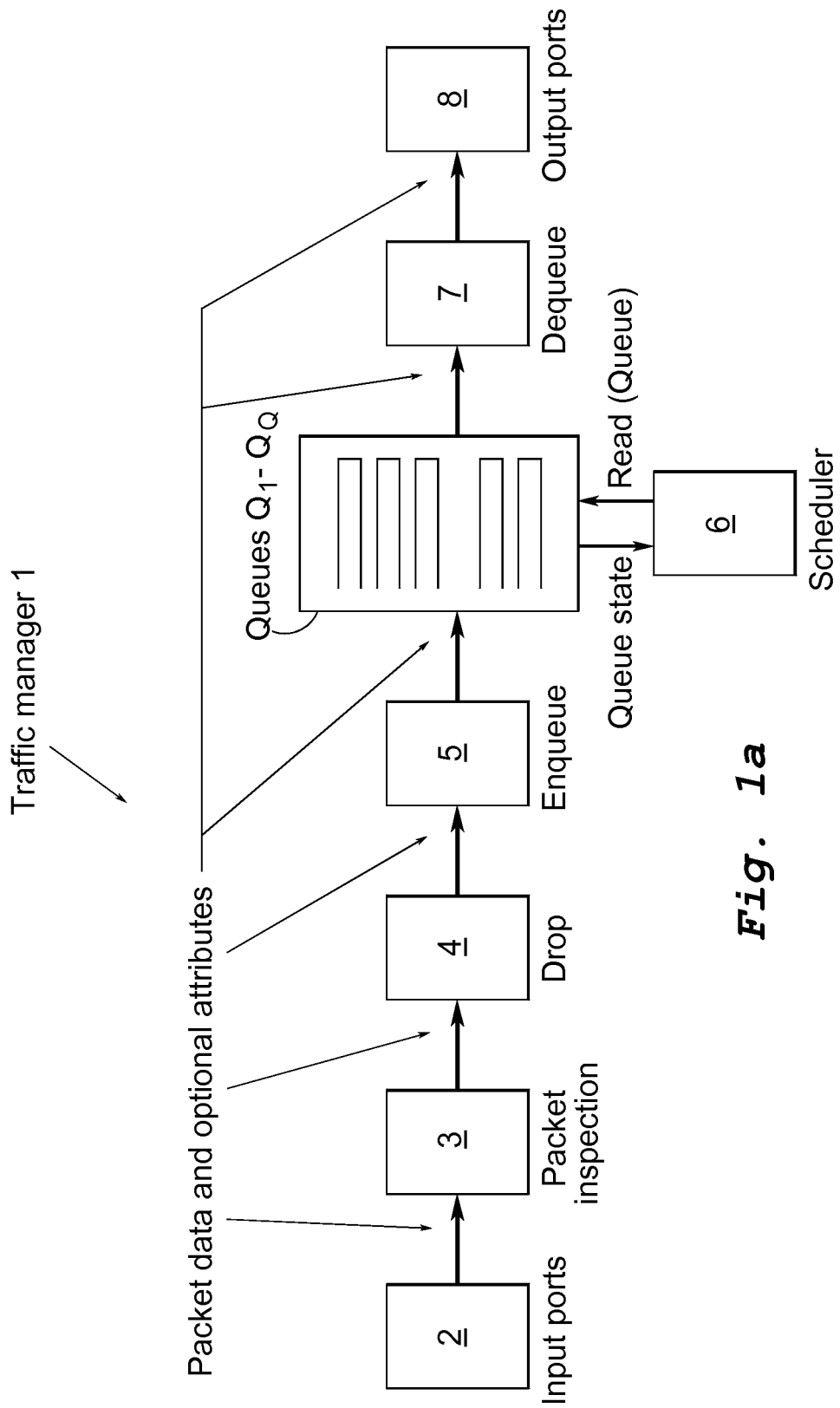

| | | | |
|---|---|---|---|
| 2004/0125815 A1* | 7/2004 | Shimazu et al. | 370/411 |
| 2005/0047425 A1 | 3/2005 | Liu et al. | |
| 2005/0074011 A1* | 4/2005 | Robotham et al. | 370/395.4 |
| 2005/0152374 A1* | 7/2005 | Cohen et al. | 370/395.4 |
| 2006/0140192 A1* | 6/2006 | Jain et al. | 370/395.4 |
| 2006/0291495 A1* | 12/2006 | Lin | 370/412 |
| 2007/0153697 A1 | 7/2007 | Kwan et al. | |
| 2010/0278190 A1* | 11/2010 | Yip et al. | 370/412 |

* cited by examiner

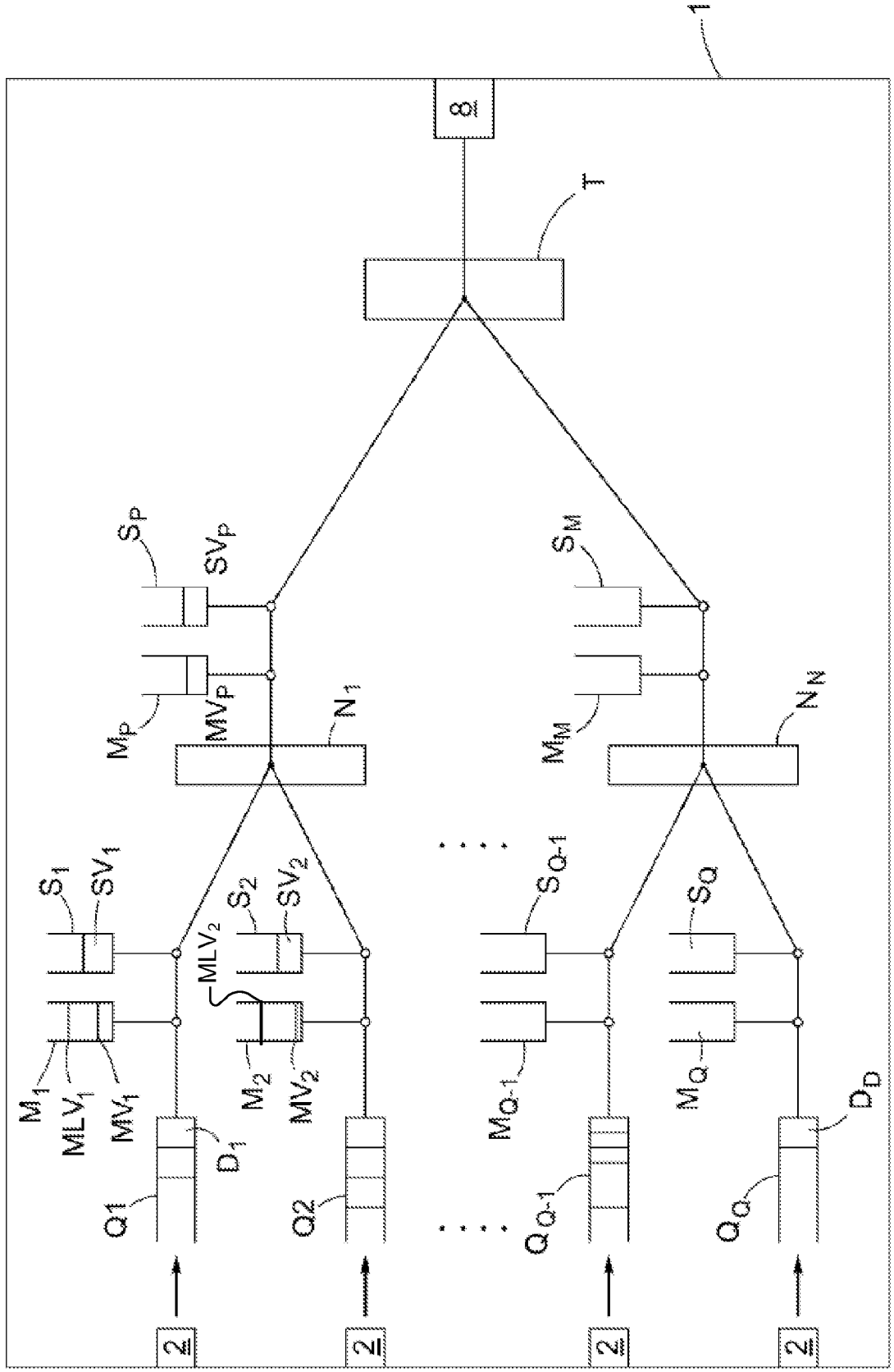

METHOD AND APPARATUS FOR MANAGING TRAFFIC IN A NETWORK

CROSS-REFERENCE TO RELATED APPLICATIONS

This application is a National Stage of International Application No. PCT/EP2009/054742, filed on Apr. 21, 2009 and claims the benefit of Swedish Application No. 0800949-0, filed Apr. 25, 2008. The entire disclosures of the applications referenced above are incorporated herein by reference. This application also claims the benefit of U.S. Provisional Application No. 61/047,681, filed on Apr. 24, 2008.

TECHNICAL FIELD

The present invention relates to a traffic manager comprising a scheduler, a number of queues and a number of scheduling nodes hierarchically arranged at one or more scheduling levels under a root node, each scheduling node being configured to serve a queue or a scheduling node of a lower scheduling level according to priorities.

BACKGROUND

In communication networks, services with a wide range of traffic characteristics and quality of service requirements may share the bandwidth of a physical or logical network interface. Examples of services with different requirements are voice, video, best effort and control messaging. A service can have a minimum rate, which is guaranteed in most cases. However, in some applications, e.g. broadband aggregation, the guaranteed minimum rate is oversubscribed, i.e. the minimum rate cannot be guaranteed at every time, causing reduced quality of service, e.g. increasing the latency for a service, in periods with exceptionally high bandwidth demands.

Assume a tree hierarchy where the root represents a 100 Mbps Ethernet interface; the children of the root are virtual local networks (VLANs); and each VLAN has two queues representing leaves in the tree, where a queue stores packets belonging to a service. Further, assume that each VLAN has a maximum rate of 8 Mbps and that one of the two queues has a minimum bandwidth guarantee of 5 Mbps. If minimum rate oversubscription is not allowed, then the 100 Mbps Ethernet interface cannot support more than 20 VLANs, since the sum of minimum bandwidth guarantees across all VLANs is: 5 Mbps*20<=100 Mbps. On the other hand, if oversubscription is allowed, more than 20 VLANs can be supported.

Since not all users are active at the same time, oversubscription can be handled by statistical multiplexing, whereby the sum of allocated minimum rates in the scheduler may exceed the total available rate.

However, situations may exist where the sum of demanded minimum rate exceeds the sum of allocated minimum rate. Even if such situations only may occur with a small probability, it is desirable to be able control those situations.

US 2005/0249220 A1 to Olsen et al. describes a hierarchical traffic management system and method ensuring that each of multiple queues is guaranteed a minimum rate, that excess bandwidth is shared in accordance with predefined weights, that each queue does not exceed a specified maximum rate, and that the data link is maximally utilized within the maximum rate constraints.

In US 2005/0249220 A1 to Olsen et al., each queue or node has two sets of attributes; enqueue attributes and dequeue attributes. The enqueue attributes control how data packets enter a queue, and as such control the depth of the queue. The dequeue attributes control how data packets exit the queue, and as such control scheduling of the queue with respect to other queues. Further, Olsen et al. describe minimum rate propagation which allows child nodes to be configured with a minimum rate, even though the parent node does not have an equal or greater minimum rate. By the minimum rate propagation, the parent node has a conditional minimum rate guarantee, meaning that when traffic is present on the child node that has a minimum rate guarantee, the parent also has the minimum rate guarantee to be used only for traffic coming from the child with the guarantee.

The minimum rate propagation disclosed by Olsen et al. provides efficiency in applications where oversubscription is common and where it is not possible or desirable to give each parent node its own guarantee, yet delivery of some guaranteed service for some child node services is required.

One drawback with the method and system disclosed by US 2005/0249220 A1 to Olsen et al. is that priorities are only propagated from a child node to a parent node and not further in the hierarchy. Thus it is not possible to, in an accurate way, handle cases in which the sum of minimum rates in child nodes are higher than the sum of minimum rates in parent nodes. Thus, Olsen et al cannot handle aggregation services and therefore not controlling bandwidth allocation in case of minimum rate oversubscription. Another drawback is that the priority attribute is associated with a single user defined bandwidth, whereby any traffic up to this bandwidth is regarded as priority traffic and is given priority over other queues of a lower priority, causing bandwidth to be distributed among the traffic in high priority queues in dependence on the scheduling algorithm used.

US 2007/0104210 A1 to Wu et al. describes dynamic management of buffers and scheduling of data transmission with minimum and maximum shaping of flows of data packets in a network device so that all of the output bandwidth can be fairly and fully utilized according to set requirements.

For each queue, during minimum bandwidth guarantee shaping, the scheduler will be selected based on round robin scheduling or strict priority scheduling, based on a separate minimum bandwidth strict priority register.

After satisfying minimum bandwidth guarantees, each queue is entered into a maximum bandwidth allowable region, where the scheduler will use either weighted deficit round robin (WDRR) or strict priority (SP) to pick a data packet from different quality of service (QoS) queues.

Neither US 2007/0104210 A1 to Wu et al. disclose a method or a system capable of handling aggregation services and the disclosed method and system is therefore not capable of controlling bandwidth allocation in case of minimum rate oversubscription.

SUMMARY

It is an object of the present invention to overcome the problems with oversubscription of a minimum rate guarantee in a communication network. Specifically, an object of the present invention is to share bandwidth in a controlled manner when the sum of demanded minimum rate is larger than the sum of allocated minimum rate. In other words, it is an object of the present invention, to provide means for flexible and predictable bandwidth allocation in cases of oversubscription of minimum guaranteed rates.

Another object of the present invention is to guarantee minimum rate at any scheduling level.

The objects are reached by a traffic manager and a method for a traffic manager comprising a scheduler, a number of queues and a number of scheduling nodes hierarchically arranged at one or more scheduling levels, each scheduling node being configured to serve a queue or a scheduling node of a lower scheduling level according to priorities, the method comprising the step of reading a first data packet comprised in a first queue based on a scheduling priority. The scheduling priority being determined at least partly on a configured priority of the first queue; at least partly on a first meter value of a first meter associated with the first queue; and at least partly on a second meter value of a second meter associated with a first scheduling node; the first scheduling node being a parent node of the first queue.

Embodiments of the present invention are defined in the dependent claims.

DETAILED DESCRIPTION OF DRAWINGS

Figure 2:
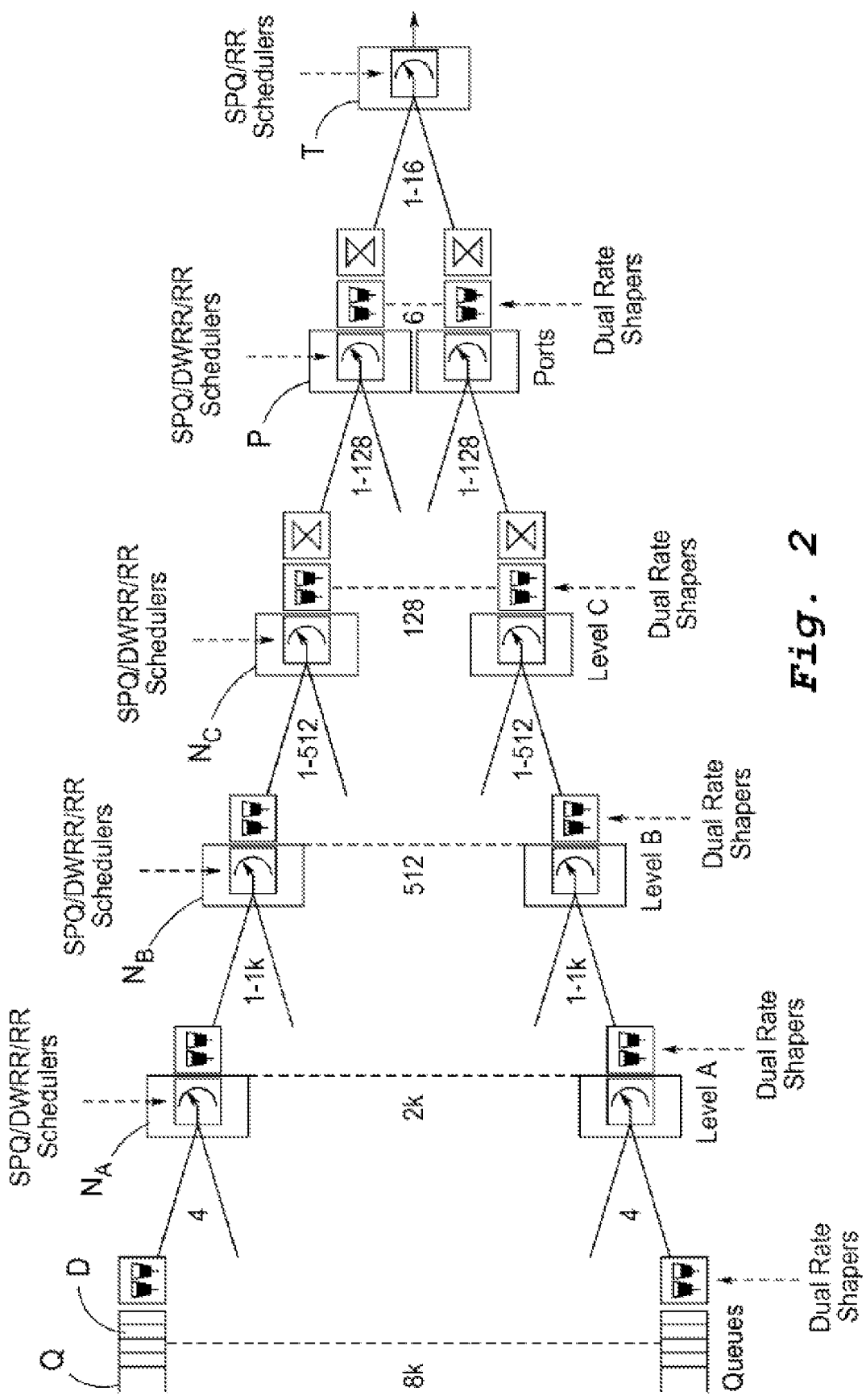
Figure 3:
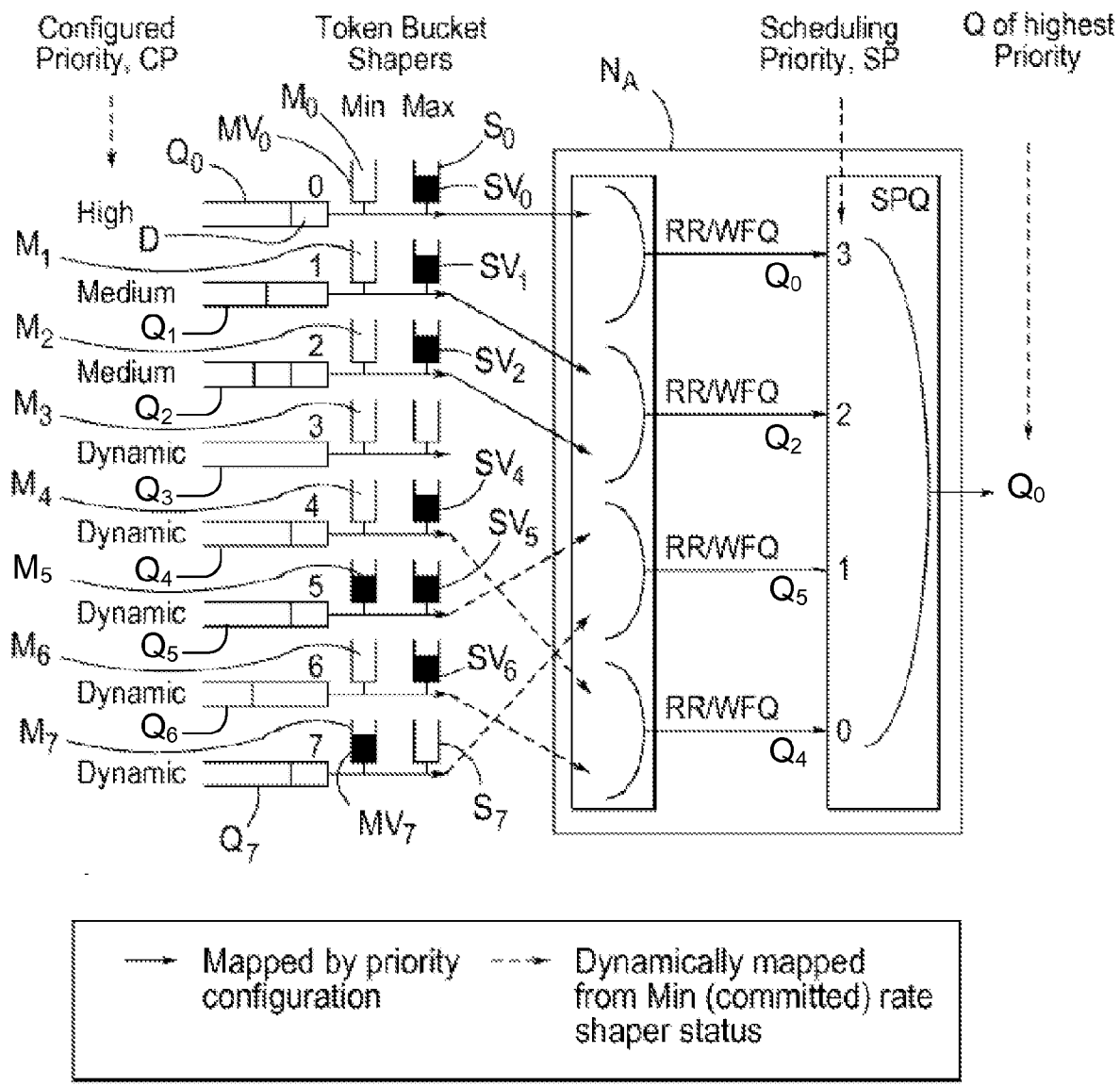
Figure 4:
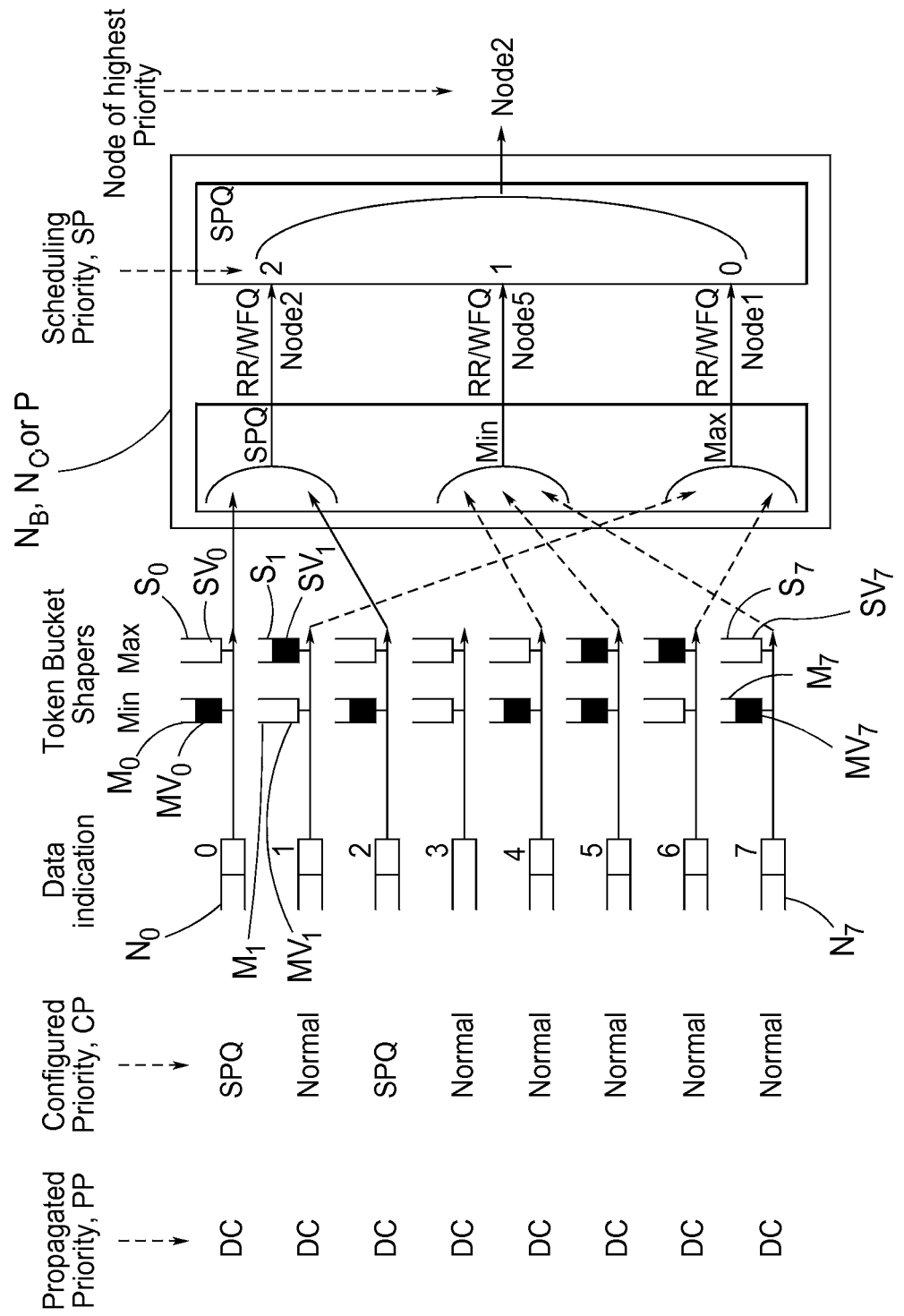
Figure 5:
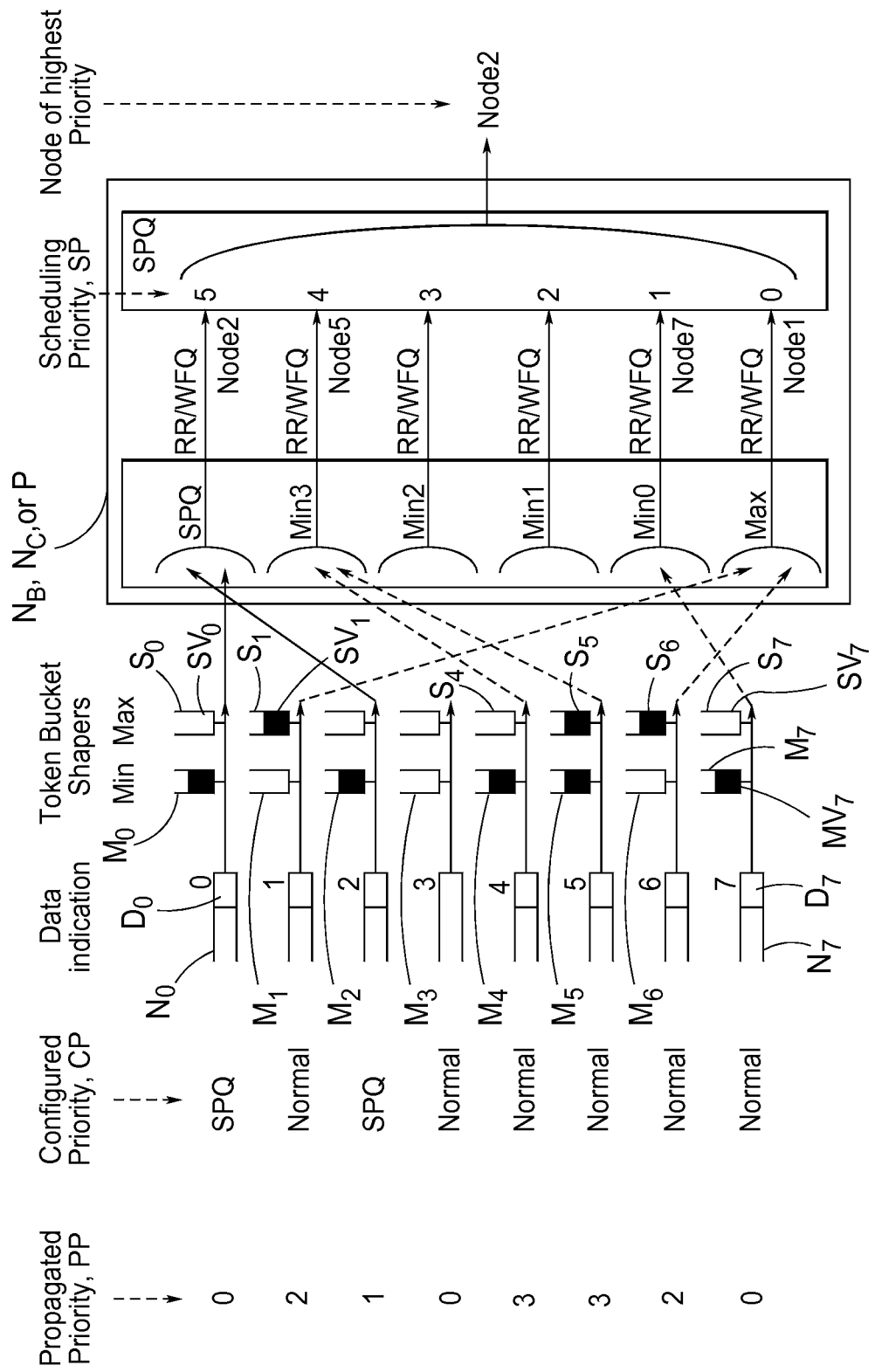
Figure 6:
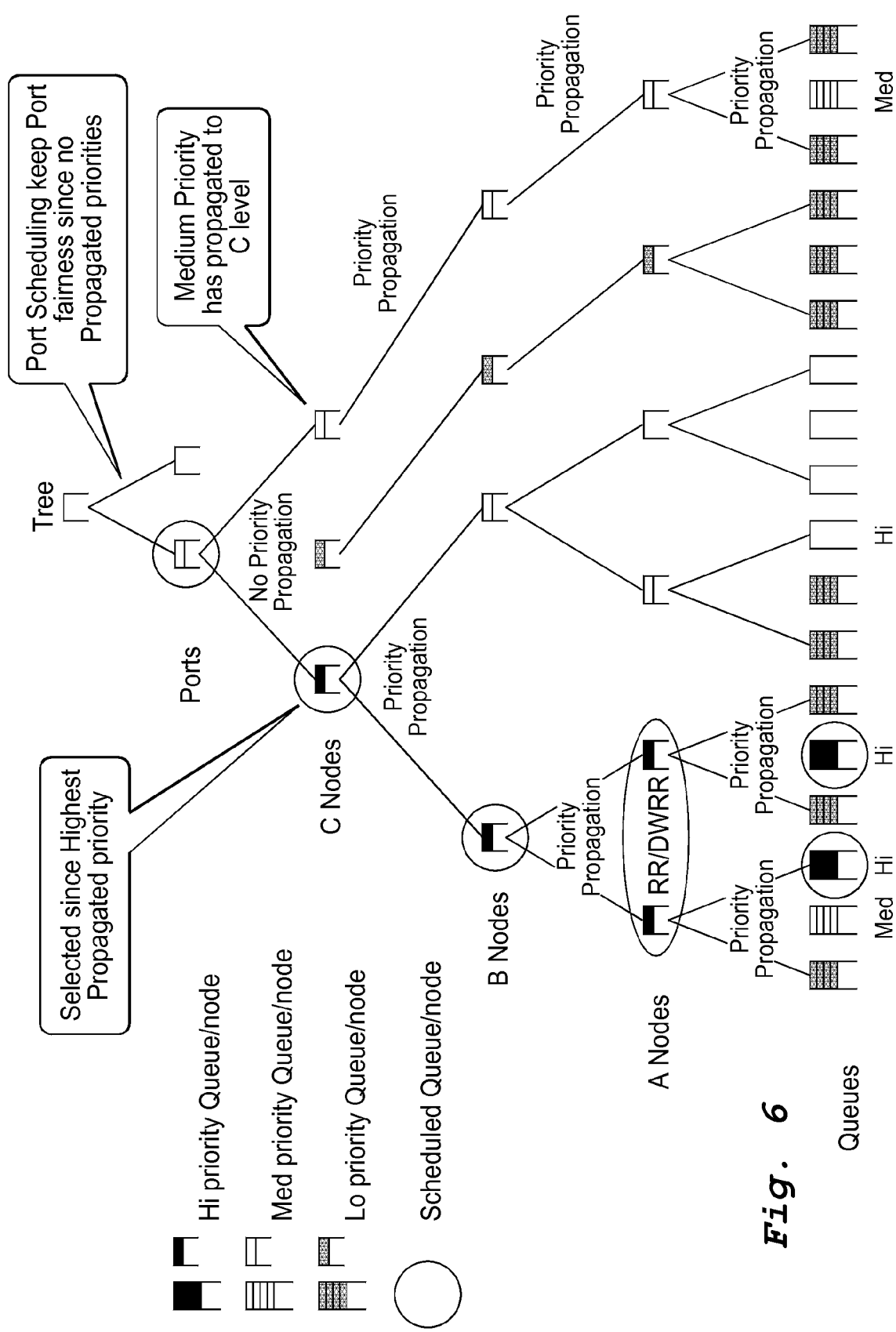
Figure 7:
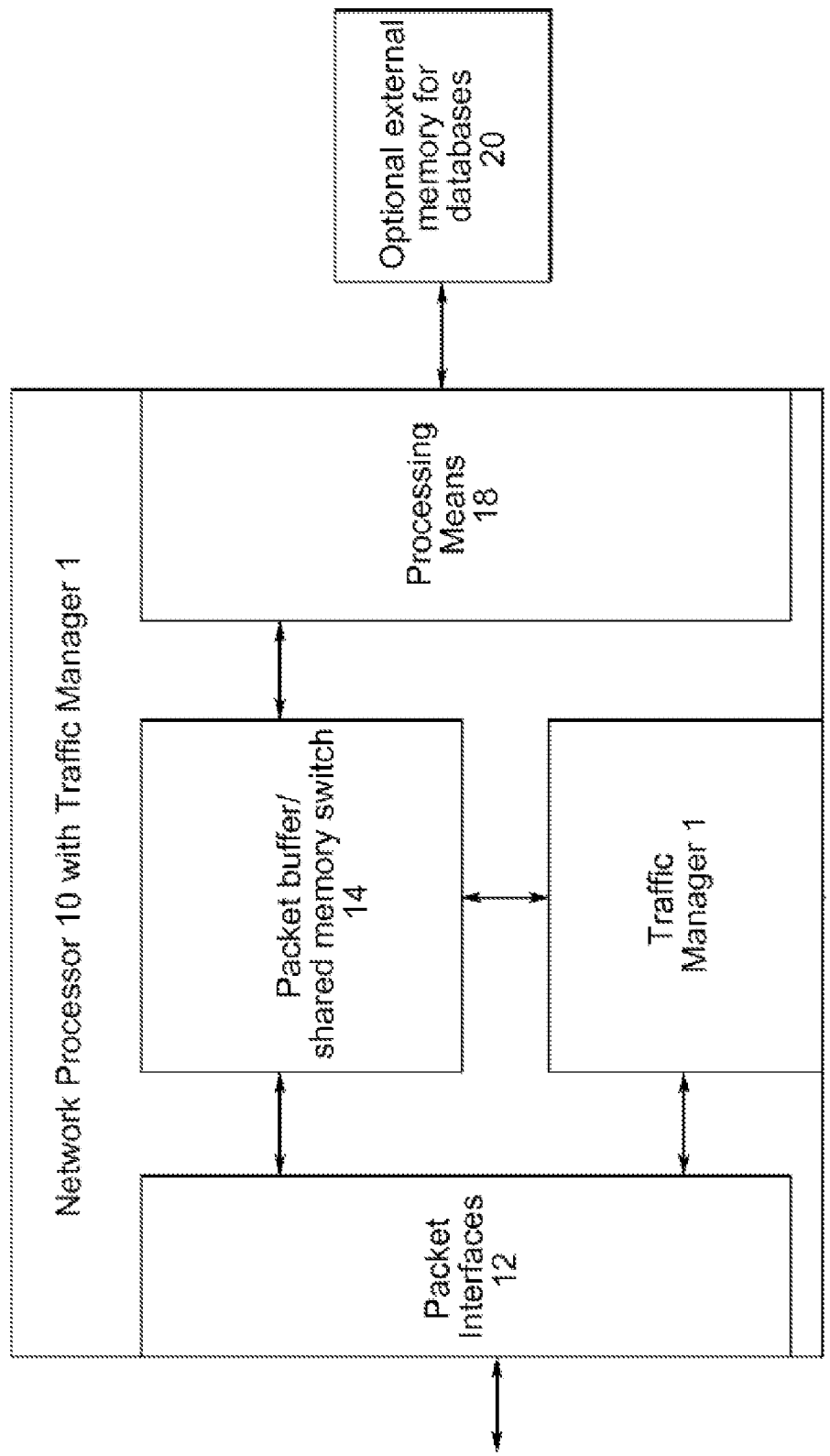
Figure 8:
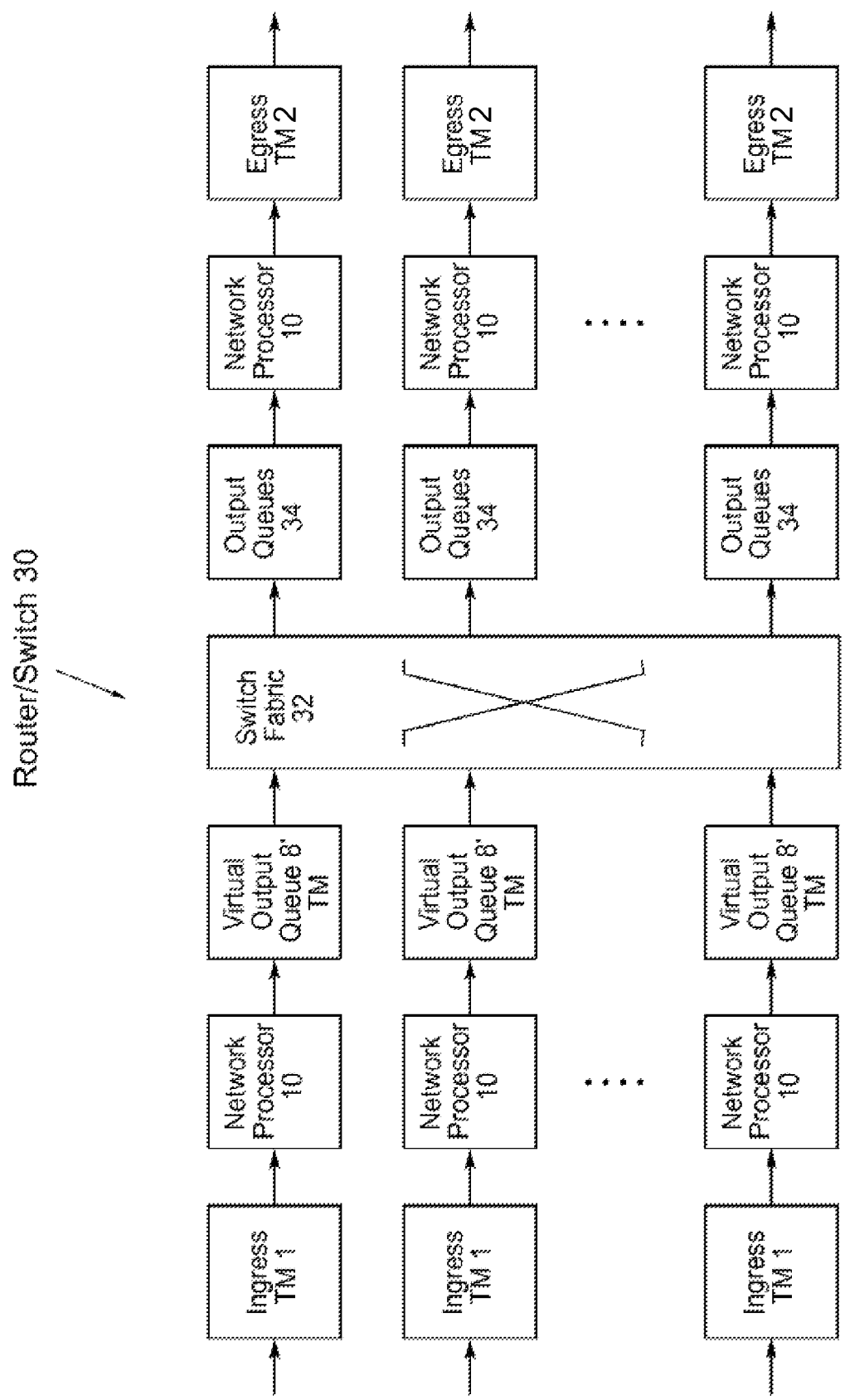

Embodiments of the present invention will be described in more detail with reference to the following drawings, in which:

FIG. 1a schematically illustrates a block diagram of a traffic manager according to an embodiment of the present invention;

FIG. 1b schematically illustrates a logical view of a traffic manager according to an embodiment of the present invention;

FIG. 2 schematically illustrates an example of a scheduling hierarchy;

FIG. 3 schematically illustrates scheduling of queues at an A scheduling node;

FIG. 4 schematically illustrates scheduling of scheduling nodes at B, C, or P level scheduling nodes, without propagated priorities;

FIG. 5 schematically illustrates scheduling of scheduling nodes at B, C, or P level scheduling nodes, with propagated priorities;

FIG. 6 schematically illustrates priority propagation in a scheduling hierarchy;

FIG. 7 schematically illustrates a network processor comprising an embodiment of the inventive traffic manager; and FIG. 8 schematically illustrates a router/switch comprising one or more traffic managers.

DETAILED DESCRIPTION OF EMBODIMENTS OF THE INVENTIONS

The present invention will now be described in more detail with reference to the drawings, in which drawings same reference numerals indicate the same or corresponding features, components or means.

FIG. 1a schematically illustrates a block diagram of a traffic manager 1 according to an embodiment of the present invention. FIG. 1b schematically illustrates a logical view of a traffic manager (TM) 1 according to an embodiment of the present invention. The traffic manager 1 may be arranged to provide buffering, queuing and scheduling of data packets in a network system. The traffic manager 1 may be comprised in a network processor 10 of the network system, cf. FIG. 7. However, it may also be arranged as a stand alone device, which may be arranged external of and in communication with a network processor.

The traffic manager may be arranged for multiple purposes in a network system. For example the traffic manager may be configured for ingress traffic management, egress traffic management, and virtual output queuing. However, it should be understood that the traffic manager may be configured for other purposes in a network system.

In ingress and egress traffic management, the traffic manager algorithms may be configured to ensure that the bandwidth is shared according to service level agreements. The services level agreements describe e.g. quality of service parameters such as minimum bandwidth, maximum bandwidth, latency, jitter and loss probability for traffic received from or transmitted to a network user.

In virtual output queuing, the traffic manager queues and schedules data packets at an input of a switch fabric depending on quality of service parameters assigned to data packets in the queues and the availability of bandwidth and data storage in the switch fabric or at the outputs of the switch fabric.

The network processor can be any of a variety of known types; including the processor described in the international patent application no. PCT/EP2007/055777 which is incorporated herein by reference. The processor may comprise processing means of a variety of known types; including an asynchronous processing pipeline, as described in the international patent application no. PCT/SE2005/0019696 which is incorporated herein by reference.

The traffic manager 1 is at arranged to receive data packets via one or several input ports 2 and to make a decision what action to take based on packet information. The traffic manager 1 may therefore comprise means for packet inspection 3. The data packet information may be comprised in the data packet, e.g. in a protocol header. Alternatively or in addition, the packet information may be transferred as a side-band information with the data packet, e.g. by attributes set by the entity transferring data packets to the traffic manager.

Further, the traffic manager may be arranged to select a queue to which the data packet is to be written. The selection of queue may be based on the packet information. For example, the queue number may be comprised in the packet information and by reading the packet information the traffic manager knows the queue to which the data packet is to be written.

The traffic manager may also be arranged to decide whether to drop a data packet by drop means 4 or to enqueue a data packet by enqueue means 5 based on the packet information, based on queue information, e.g. the current queue length or average queue length and/or based on parameters stored in the traffic manager and associated with the queue, such as drop thresholds and parameters for active queue management, e.g. weighted random early discard.

If a data packet is written to a queue Q it becomes available for scheduling and dequeuing after any preceding data packet in the queue has been dequeued. The queue may be served by a scheduler 6, which in turn may be served by other schedulers at higher levels in a scheduling hierarchy. A scheduler 6 is arranged to use a scheduling algorithm to determine the service order of queues or scheduler nodes. A dequeue means 7 may be arranged to dequeue a data packet. Non-limiting examples of scheduling algorithms comprise first-come-first-serve, time-division multiplexing, round-robin, weighted round-robin, strict priority queuing, deficit round-robin, deficit weighted round-robin, weighted fair queuing and earliest deadline first.

Dequeing from a queue or from a scheduler node may be temporarily blocked by traffic shapers, such as leaky buckets or token buckets, or by backpressure signals received by the traffic manager. The backpressure signals may be received from a rate-limited output port whose local storage for data pending for transmission is almost full.

On dequeing, a data packet is transmitted through the output port 8 of the traffic manager. Optionally, the traffic manager is arranged to post-process the data packet before transmission. For example, the traffic manager may be arranged to edit the data packet header or to write information to sideband attributes.

In FIG. 1b, data packets $D_1$-$D_D$ enter the traffic manager 1 through a data interface comprising one or more input ports 2, and are stored in one or more input buffers $Q_1$-$Q_Q$, such as one or more queues, before being scheduled in a manner described below. After being scheduled, the data packets $D_1$-$D_D$ are read from the queues and exit the traffic manager through one or more output ports 8.

Further, traffic manager 1 comprises a number of scheduling nodes $N_1$-$N_N$ hierarchically arranged at one or more scheduling levels $L_1$-$L_L$, each scheduling node $N_1$-$N_N$ being configured to serve a queue $Q_1$-$Q_Q$ or a scheduling node $N_1$-$N_N$ of a lower scheduling level $L_1$-$L_L$ according to priorities.

The traffic manager 1 comprises a scheduler 6, e.g. a hierarchical scheduler, that may comprise a number, e.g. four, identical schedulers, each scheduler having a single scheduling hierarchy and being allocated to a set of traffic interfaces; matching its data bandwidth and packet rate. The lowest leaves of a scheduler hierarchy are the queues Q. Data packets from the queues are successively aggregated by scheduling nodes N arranged in a number, e.g. five, levels. Each scheduler can be flexible configured hierarchically featuring 8192 queues and more the 2048 internal scheduling nodes which are shared between the traffic interfaces allocated to the scheduler. FIG. 2 schematically illustrates an example of a scheduling hierarchy.

As illustrated in FIG. 2, data packets D are stored in 8192 FIFO (first-in-first-out) queues Q, and four queues are mapped to one out of 2048 level A scheduling nodes $N_A$. 1-1024 level A scheduling nodes $N_A$ are mapped to one out of 512 level B scheduling nodes $N_B$, and 1-512 level B scheduling nodes $N_B$ are mapped to one out of 128 level C scheduling nodes $N_C$. 1-128 level C scheduling nodes $N_C$ are mapped to one out of 16 ports P, and 1-16 ports P are mapped to the scheduler tree T.

As an example, an egress scheduler at a user side of an oversubscribed Metro Ethernet system may assign 12 ports to Gigabit Ethernet interfaces. Within each port, level B and level C correspond to logical interfaces and services, level A corresponds to users, and the queues correspond to applications. It should be understood that the number of levels may vary. Further, if a more shallow hierarchy is needed, level B or level C may for example be configured as transparent dummy layers connecting to upper or lower level nodes one-to-one.

Each of the scheduling nodes $N_A$, $N_B$, and $N_C$, and each of the ports P may comprise a strict priority scheduler, a round robin (RR) scheduler or a deficit weighted round robin (DWRR) scheduler. The scheduler tree T may comprise a strict priority scheduler or a round robin (RR) scheduler.

Further, as illustrated in FIGS. 1b and 2, each of the queues Q, scheduling nodes N, and ports P is associated with dual rate shapers, e.g. dual token bucket shapers. The rate shapers are bit rate shapers.

In this description, one of the dual rate shapers, a minimum rate shaper also called a minimum (committed) token bucket shaper, is referred to as a meter M (e.g., meters $M_1$, $M_2$, ... $M_{Q-1}$, $M_Q$ and $M_P$ ... $M_M$) while the other, a maximum rate shaper also called maximum (excess) token bucket shaper, is referred to as a shaper S (e.g., shapers $S_1$, $S_2$, ... $S_{Q-1}$, $S_Q$ and $S_P$ ... $S_M$ and corresponding shaper values $SV_1$-$SV_Q$ and $SV_P$).

The meter M is configured to define a dynamic priority, whereby the priority of the associated queue, node or port, can be dynamically changed between a high priority level and a low priority level in dependence of the relation between a meter value $M_V$ (e.g., $MV_1$-$MV_Q$ and $MV_P$) and a meter limit value MLV of the meter M. As illustrated in FIG. 1b, the first meter $M_1$ has a meter value $MV_1$ that is less than the meter limit value $MLV_1$ giving that the priority is low. However, if the meter value $MV_1$ is equal to or larger than the meter limit value $MLV_1$, the priority would be high.

The shaper S is configured to limit the bit rate to the output port 8 of the traffic manager 1.

A first data packet $D_1$-$D_D$ comprised in a first queue $Q_1$-$Q_D$ is read from the first queue and for example admitted to the output port 8 of the traffic manager 1 based on a scheduling priority SP. The scheduling priority SP is determined at least partly on a configured priority $CP_1$-$CP_Q$ of the first queue $Q_1$-$Q_Q$, cf. FIG. 3; at least partly on a first meter value $MV_1$-$MV_M$ of a first meter $M_1$-$M_M$ associated with the first queue $Q_1$-$Q_Q$; and at least partly on a second meter value $MV_1$-$MV_M$ of a second meter $M_1$-$M_M$ associated with the first scheduling node $N_1$-$N_N$.

In embodiments, the scheduling priority may further be determined at least partly on a configured priority $CP_1$-$CP_N$ of a first scheduling node $N_1$-$N_N$; the first scheduling node $N_1$-$N_N$ being a parent node of the first queue $Q_1$-$Q_Q$.

The first and second meters $M_1$-$M_M$ may be so-called rate shapers and may be provided in any suitable form, for example as software program, or part thereof, or as digital or analogue circuits of electrical, optical or mechanical components. The shapers use loose or strict token buckets algorithms, so that admittance of data is based on a value of a credit parameter. However, any other suitable admittance algorithm may be used.

The meters $M_1$-$M_M$ being configured to dynamically change its priority level between a high priority level when the meter value $MV_1$-$MV_M$ is equal to or higher than a meter limit value MLV (e.g., $MLV_1$-$MLV_M$) and a low priority level when the meter value $MV_1$-$MV$ is lower than the meter limit value MLV.

The meter limit values $MLV_1$ and $MLV_2$ of the first and second meters $M_1$-$M_M$, respectively, are set to zero, the first and second meters will have a high priority if their meter value is equal to or greater than zero, and they will have a low priority if their meter value is less than zero.

The first and second meter values $MV_1$-$MV_M$ of the first and second meters $M_1$-$M_M$ are decreased by an amount corresponding to the amount of bits of the first data packet $D_1$-$D_D$, if the first data packet is read from the queue and admitted to the output port 8 of the traffic manager 1. Optionally, the meter values may in addition be decreased by a shaping offset to compensate in advance for future changes in packet size; e.g, by adding or removing packet headers. The shaping offset may be positive, zero, or negative. The shaping offset may be configured per queue or per node or be passed to the traffic manager with the packet as an attribute.

Further, the meter values $MV_1$-$MV_M$ of the first and second meters $M_1$-$M_M$ are periodically increased, e.g. every clock cycle of the processor, by a meter value amount. The meter value amount may be set during configuration and may be given by amount/interval [bits/s]). In one embodiment, if the thus increased meter value exceeds configurable burst size parameters BS1-BSM the meter values are set to BS1-BSM.

It should be understood that in embodiments of the present invention, the first and second meter values $MV_1$-$MV_M$ of the first and second meters $M_1$-$M_M$ may be increased by a suitable amount, e.g. by an amount corresponding to the amount of bits of the first data packet $D_1$-$D_D$, if the first data packet is read from the queue and admitted to the output port 8 of the traffic manager 1.

In such embodiments, the priority level of the meter may be high when the meter value is less than or equal to a meter limit value, and the priority level may be low when the meter value is higher than the meter limit value.

Further, it should be understood that in embodiments wherein the first and second meter values $MV_1$-$MV_M$ are increased if the first data packet is read from the queue and admitted to the output port 8 of the traffic manager 1, the meter values $MV_1$-$MV_M$ of the first and second meters $M_1$-$M_M$ are periodically decreased, e.g. every clock cycle of a processor, by a meter value amount.

In embodiments, the reading of the first data packet $D_1$-$D_D$ and further admittance of the first data packet $D_1$-$D_D$ to the output port of the traffic manager may also be based:
- at least partly on a first shaper value $SV_1$-$SV_M$ of a first shaper $S_1$-$S_M$ associated with the first queue $Q_1$-$Q_O$; and
- at least partly on a second shaper value $SV_1$-$SV_M$ of a second shaper $S_1$-$S_M$ associated with the first scheduling node $N_1$-$N_N$.

The shapers may be provided in any suitable form, for example as software program, or part thereof, or as digital or analogue circuits of electrical, optical or mechanical components. The shapers use loose or strict token buckets algorithms, so that admittance of data is based on a value of a credit parameter. However, any other suitable admittance algorithm may be used.

A first and a second shaper value $SV_1$-$SV_M$ of the first and the second shapers $S_1$-$S_M$ associated with the first queue $Q_1$-$Q_O$ and the first scheduling node $N_1$-$N_N$, respectively, are decreased with a value corresponding to the amount of bits of the first data packet $D_1$-$D_D$, if the first data packet $D_1$-$D_D$ is read from the first queue $Q_1$-$Q_O$.

Further, the first and second shaper values $SV_1$-$SV_M$ of the first and second shapers $S_1$-$S_M$ are periodically increased, e.g. every clock cycle of the processor 2, by a shaper value amount. The shaper value amount may be set during configuration and may be given by amount/interval [bits/s]). In one embodiment, if the thus increased shaper value exceeds configurable burst size parameters BS1-BSM the shaper values are set to BS1-BSM.

It should be understood that in embodiments of the present invention, the first and second shaper values $SV_1$-$SV_M$ of the first and second shapers $S_1$-$S_M$ may be increased by a suitable amount, e.g. by an amount corresponding to the amount of bits of the first data packet $D_1$-$D_D$, if the first data packet is read from the queue and admitted to the output port 8 of the traffic manager 1.

Further, it should be understood that in embodiments wherein the first and second shaper values $SV_1$-$SV_M$ are increased if the first data packet is read from the queue and admitted to the output port 8 of the traffic manager 1, the shaper values $SV_1$-$SV_M$ of the first and second shapers $S_1$-$S_M$ are periodically decreased, e.g. every clock cycle of a processor, by a shaper value amount.

In embodiments, the reading of the first data packet $D_1$-$D_D$ and further admittance of the first data packet $D_1$-$D_D$ to the output port of the traffic manager may also be based:
- at least partly on a propagated priority PP corresponding to a scheduling priority SP propagated from the first queue $Q_1$-$Q_O$ at a lower scheduling level $L_1$-$L_L$ to the first scheduling node $N_1$-$N_N$ at a higher scheduling level $L_1$-$L_L$.

Further, the reading of the first data packet $D_1$-$D_D$ and further admittance of the first data packet $D_1$-$D_D$ to the output port of the traffic manager may also be based:
- at least partly on a propagated priority PP corresponding to a scheduling priority SP propagated from the first scheduling node $N_1$-$N_N$ at a lower scheduling level $L_1$-$L_L$ to a parent scheduling node $N_1$-$N_N$ at a higher scheduling level $L_1$-$L_L$.

The configured priority CP of the first queue $Q_1$-$Q_O$ may be strict priority, e.g. high priority, medium priority or low priority; or dynamic priority. FIG. 3 shows queues configured to have high priority, medium priority and dynamic priority.

In embodiments, the scheduling priority SP at a queue level is 3, 2, 1, 0, DC; wherein 3 being the highest scheduling priority, and wherein DC stands for "do not care", i.e. scheduling priority has no effect on the scheduling decision.

The configured priority CP of the first scheduling node $N_1$-$N_N$ may be strict priority (SPQ) or normal priority.

In embodiments, the scheduling priority SP at a node level is 5, 4, 3, 2, 1, 0, DC; 5 being the highest scheduling priority.

However, it should be understood that the present invention is not limited to the priorities, e.g. the configured priorities and scheduling priorities, given, but these priorities are only to be considered as examples.

FIG. 3 schematically illustrates scheduling of queues at a scheduling node $N_A$. As illustrated in FIG. 3, the queues $Q_0$-$Q_7$ have the configured priorities; high, medium, medium, dynamic, dynamic, dynamic, dynamic, dynamic, respectively. Every queue except $Q_3$ comprises a data packet D. Further, each of the queues has a meter M (e.g., $M_0$-$M_7$) having a meter value MV and a shaper S having a shaper value SV. The queues $Q_0$-$Q_4$, and $Q_6$ have meter values less than the meter limit values (shown as empty meter buckets in the figures), indicating that the queues $Q_0$-$Q_4$, and $Q_6$ have low priority. The queues $Q_5$ and $Q_1$ have meter values $MV_5$ and $MV_7$ larger than the respective meter limit values (shown as filled buckets in the figures), indicating that the queues $Q_5$ and $Q_7$ have a high priority.

Further, each of the queues $Q_0$-$Q_2$, and $Q_4$-$Q_6$ has a shaper S having a shaper value SV equal to or larger than the shaper limit value (shown as filled shaper buckets in the figures). The queues $Q_3$ and $Q_7$ have shapers $S_3$ and $S_7$, respectively, having shaper values $SV_3$ and $SV_7$, respectively, less than the respective shaper limit value (shown as empty shaper buckets in the figures).

As illustrated, at a scheduling node, the queues $Q_0$-$Q_2$ having a strict configured priority, e.g. a high or medium configured priority, are scheduled in accordance with their configured priority as long as the queue contains a data packet and has shaping tokens i.e. a shaping value SV larger than the shaping limit value.

Further, for a queue having a dynamic configured priority both the meter M and the shaper S is used for scheduling. All dynamically configured queues comprising a data packet and having a meter value MV larger than the meter limit value MLV is scheduled before dynamically configured queues having a meter value MV less than the meter limit value. If two dynamically configured queues have equal meter values, the queue having the highest shaper value may be scheduled before the other queue.

As illustrated in FIG. 3, the A scheduling node $N_A$ may comprise four round robin (RR) or weighted fair queuing (WFQ) schedulers and a strict priority (SPQ) scheduler. The result from each of the four RR or WFQ schedulers are queue Q0, queue Q2, queue Q5, and queue Q4 associated with four strict scheduling priority values: 3, 2, 1, 0, respectively. 3 being the highest scheduling priority and 0 the lowest scheduling priority. After a strict priority scheduling, queue $Q_0$ will be selected.

FIG. 4 schematically illustrates scheduling of scheduling nodes at B, C, or P level scheduling nodes, without propagated priorities. As illustrated, the nodes N0 and N2 have the configured priority strict priority (SPQ) and will therefore be mapped to the SPQ scheduler of the node $N_B$, $N_C$ or port P and scheduled with the highest priority.

The nodes $N_1$, and $N_3$-$N_7$ have the configured priority normal, and will therefore be scheduled in dependence of the meter value $MV_1$, $MV_3$-$MV_7$ of the meters $M_1$, $M_3$-$M_7$, respectively.

The nodes N4, N5, and N7 have meter values MV4, MV5, and MV7 larger than the meter limit values MLV4, MLV5, and MLV7, and will therefore be mapped to the meter scheduler of the node NB, NC or port P, the meter scheduler being indicated by Min in FIG. 4.

The nodes N1 and N6 have a meter value less than the meter limit values MLV1 and MLV6, respectively, and will therefore be scheduled in dependence of their shaper value. Therefore the nodes N1 and N6 are mapped to the shaper scheduler of node NB, NC or port P, the shaper scheduler being indicated by Max in FIG. 4. By means of RR scheduling or WFQ scheduling, the nodes N2, N5 and N1 will be mapped to the strict scheduling priority levels 2, 1, and 0, respectively. Thereafter, a strict priority scheduling will schedule node N2 as the highest priority node.

FIG. 5 schematically illustrates scheduling of scheduling nodes at B, C, or P level scheduling nodes, with propagated priorities. As illustrated in the figure, the node N0-N7 has the same configured priority as the configured priority of the nodes shown in FIG. 4. Further, the meter values of the meters of the nodes correspond to the meter values of the meters of the nodes in FIG. 4. The same is true for the shaper values of the shapers. However, in FIG. 5, priorities are propagated from a child node to a parent node. In the shown example, the parent nodes N0-N7 have the propagated priority 0, 2, 1, 0, 3, 3, 2, 0, respectively.

As illustrated, the nodes N0 and N2 configured with a strict priority SPQ are mapped to a SPQ scheduler of the parent node independently of the propagated priority. The nodes N4 and N5 configured with a normal priority, having a meter value MV4 and MV5 larger than the meter limit values MVL4 and MVL5, respectively, and the highest propagated priority, 3, are mapped to the highest meter scheduler indicated as Min3 in the FIG. 5.

No nodes are configured with normal priority, have a meter value larger than a meter limit value and a propagated priority of 2 or 1, and therefore no nodes are mapped to the next highest meter scheduler indicated as Min2, and to the next-next highest meter scheduler indicated as Min1, in FIG. 5.

Only one node, node N7, has a normal configured priority, a meter value MV7 larger than the meter limit value MVL7, and a propagated priority of 0 and is therefore mapped with the lowest meter scheduler indicated as Min0 in FIG. 5.

Two nodes, node N1 and N6, are configured with normal priorities, but have meter values MV1 and MV6 less than the meter limit values MVL1 and MVL6, respectively, and will therefore not be mapped to one of the meter schedulers Min3, Min2, Min1, or Min0. Instead, the nodes N1 and N6 will be mapped to a shaper scheduler, indicated as Max in FIG. 5, since the shaper values SV1 and SV6 are larger than the shaper limit values SVL1 and SVL6, respectively.

By means of RR scheduling or WFQ scheduling, node N2 is selected over node N0 since N2 has a higher propagated priority, i.e. 1 instead of 0. Since node N2 is configured with a strict priority, node N2 is given the highest strict scheduling priority value, i.e. 5.

By means of RR scheduling or WFQ scheduling, node N5 is selected over node N4 and mapped with the next highest strict scheduling priority value, i.e. 4. Further, since node N7 is the only node mapped with the lowest meter scheduler Min0, it is given the next lowest priority value, i.e. 1.

By means of RR scheduling or WFQ scheduling, node N1 is selected over node N6 and given the lowest scheduling priority value, i.e. 0. Finally, by means of strict priority scheduling, node N2 is scheduled as the highest priority node and it's scheduling priority may be propagated to a higher level.

FIG. 6 schematically illustrates an example of a single queue high priority propagation in a scheduling hierarchy. The scheduling of queues, nodes, and ports may be accomplished as previously described and the determined scheduling priority may be propagated in the hierarchy. Propagated priority is a way to prefer nodes with higher priority queues and meter values, e.g. conforming minimum (committed) token buckets, all the way through the hierarchies, over other nodes that have only lower priority queues, and that have high priority queues but no meter value, conforming minimum (committed) token buckets, all the way through the hierarchies.

In the shown scheduling hierarchy, four propagated priority levels exist, each of which priority levels behaves on the same principles. As illustrated, priority is propagated from the queues to the A node, from the A nodes to the B nodes, from the B nodes to the C nodes, and from the C nodes to the ports. However, it should be understood that the priority propagation can be limited per scheduler, e.g. the priority propagation can be limited to the queue level and the A node level, but not allowed above the B node level.

Propagated priorities are used by the node scheduling logic, so that the node with the highest priority queue is selected before a node with a lower priority queue.

In cases with dynamic priorities, both on a queue level and on a node level, the propagated priorities are visible to the scheduling logic as long as the meter value are higher than a limit value, i.e. as long as minimum tokens exists. When the meter value is less than a limit value, i.e. when the minimum tokens are depleted, the node priority is changed to the lowest priority.

Strict priority can be enabled for any node in the scheduling hierarchy. Strict priorities are served with the highest priority ignoring their propagated priority. However, they still propagate their propagated priority (from lower levels) on the same manner as node configured as having a normal priority.

Scheduling priorities to queues are shown in Table 1. The scheduled priorities are propagated to upper levels, with the propagated priority mechanism. Locally they are used for scheduling a queue. The label Min TB represents a meter value and if it is indicated as "yes", the meter value is larger than the meter limit value, i.e. high priority. If it is indicated as "no", the meter value is less than the meter limit value, i.e. low priority. The label Max TB represents a shaper value and "yes"/"no" indicates that the shaper value is larger/less than the shaper limit value.

TABLE 1

| Data | Queue priority | Min TB | Max TB | Scheduling Priority |
|------|----------------|--------|--------|---------------------|
| Yes*** | Hi | Yes* | DC | 3 |
| Yes | Medium | Yes | DC | 2 |
| Yes | Dynamic | Yes | DC | 1 |
| Yes | Dynamic | No | Yes** | 0 |
| No | DC | DC | DC | DC**** |

TABLE 1-continued

| Data | Queue priority | Min TB | Max TB | Scheduling Priority |
|---|---|---|---|---|
| Yes | Hi | No | DC | DC |
| Yes | Medium | No | DC | DC |
| Yes | Dynamic | No | No | DC |

*Min Token Bucket is on conforming status
**Max Token Bucket is on conforming status
***Queue has data to transmit
****the queue is not valid for scheduling Scheduling priorities to nodes are shown in Table 2. Theses priorities are calculated based on configuration priority and on Token bucket state, e.g. based on the meter value of the associated meter and the shaper value of the associated shaper. The scheduling priorities are propagated to upper levels with the propagated priority mechanism. Locally the scheduling priorities are used for scheduling a node.

TABLE 2

| Data | Strict priority | Min TB | Propagated Priority | Max TB | Scheduling Priority |
|---|---|---|---|---|---|
| Yes*** | Yes | Yes* | DC | DC | 5 |
| Yes | No | Yes | 3 | DC | 4 |
| Yes | No | Yes | 2 | DC | 3 |
| Yes | No | Yes | 1 | DC | 2 |
| Yes | No | Yes | 0 | DC | 1 |
| Yes | No | No | DC | Yes** | 0 |
| No | DC | DC | DC | DC | DC**** |
| Yes | Yes | No | DC | DC | DC |
| Yes | No | No | DC | No | DC |

*Min Token Bucket is on conforming status
**Max Token Bucket is on conforming status
***Node has queues with data under it and tokens all the way up the tree
****the Node is not valid for scheduling Scheduling priorities to ports are shown in table 3. These priorities are calculated based on configuration priority and on Token bucket state, e.g. the meter value of the associated meter and the shaper value of the associated shaper. The scheduling priorities are used for scheduling a port.

TABLE 3

| Data | Strict Priority | Min TB | Max TB | Scheduling Priority |
|---|---|---|---|---|
| Yes*** | Yes | Yes* | DC | 2 |
| Yes | No | Yes | Yes** | 1 |
| Yes | No | No | Yes | 0 |
| No | DC | DC | DC | DC**** |
| Yes | Yes | No | DC | DC |
| Yes | No | No | No | DC |

*Min Token Bucket is on conforming status
**Max Token Bucket is on conforming status
***Port has queues with data under it and tokens all the way up the tree
****The Port is not valid for scheduling FIG. 7 schematically illustrates a network processor 10 comprising an embodiment of a traffic manager 1. As illustrated, the network processor 10 comprises a processing means 18 and a data packet interface 12 arranged to receive and/or transmit data packets. For example, the interface 12 may be 100 Mbps Ethernet MACs, Gigabit Ethernet MACs, 10-Gigabit Ethernet MACs, PCIe interfaces, SPI-4.2 interfaces, Interlaken interfaces, etc.

The interface 12 is arranged in communication with the traffic manager 1 and with a packet buffer 14, e.g. a shared memory switch. The shared memory switch 14 is configured to temporarily store data packets leaving one of the network subsystems, e.g. the interface 12, the traffic manager 1 or the processing means 18. Thus, the shared memory switch 14 may be arranged to interconnect network subsystems.

The processing means 18 may be a dataflow pipeline of one or more processors with special-purpose engines. The processing means 18 is configured to classify and edit data packet information, e.g. headers, to perform functionalities such as switching, forwarding and firewalling.

Further, an optional external memory 20 for one or more databases, comprising e.g. packet forwarding tables, may be arranged in communication with the network processor 10.

In embodiments of the network processor 10, a data packet is received via the interface 12 of the network processor 10. The interface 12 writes the packet to the shared memory switch 14 that buffers the packet. The shared memory switch 14 writes the packet to the processing means 18 that processes the packets and sets packet information for use by the traffic manager 1. The processing means 18 writes the packet to the traffic manager 1. Optionally, the processing means 18 writes the packet to the traffic manager via the shared memory switch 14. Further, the traffic manager 1 is configured to decide what action to be taken based on e.g. packet information prepared by the processing means 18. If the packet is enqueued in the traffic manager and later dequeued, the traffic manager writes the packet either to the interface 12, optionally via the shared memory switch 14, or back to the processing means 18, optionally via the shared memory switch 14, for post-processing. From the processing means the packet is written back to the interface 18, optionally via the shared memory switch 14. Finally, the packet is transmitted from the network processor 10 via an interface 18.

FIG. 8 schematically illustrates a router or a switch 30 comprising one or more traffic managers 1, such as one or more ingress traffic managers 1 and one or more egress traffic managers 2. The router/switch 30 may also comprise several network processors 10. A traffic manager 1 and/or 2 may be comprised in a network processor 10. However, It should be understood that a network processor 10 may be configured without a traffic manager 1 and/or 2.

As illustrated in FIG. 8, the router/switch 30 may comprise one or more input queues to a switch fabric 32, e.g. a bus, comprised in the router/switch 30, and one or more output queues 34 from the switch fabric 32. The input queues may be virtual output queues 8' of a traffic manager.

It should be understood that embodiments of the present invention are configured to guarantee minimum rate at any scheduling level. For example, a scheduling hierarchy may have a group of child nodes at a scheduling level that are associated with a parent node at the next level. The nodes have a minimum rate relating to their meter values and a maximum rate relating to their shaper value. Assume that the bandwidth offered to the parent node is greater than or equal to the sum of minimum rates of the child nodes but less than the sum of maximum rates of the child nodes. In such situations, even if all priorities propagated to the child nodes are zero, the child nodes which do not exceed their minimum rates are scheduled with a higher priority than the child nodes exceeding their minimum rates, and consequently guaranteeing minimum rate at any level.

Minimum rate guarantee at any scheduling level is also exemplified in the following example:

Assume that a node at level A corresponds to a network user and that a queue corresponds to an application. Also assume that each user has at least one "best effort" application queue; e.g. for web traffic, which has a maximum rate but not a minimum rate. Further, assume that each user has a maximum rate and a minimum rate. By configuring the user minimum rates such that their sum does not exceed the available bandwidth allocated to the level B node aggregating the users, each user is guaranteed to get her minimum rate.

Although, the present invention has been described in accordance with the embodiments shown, one of ordinary skill in the art will readily recognize that there could be variations made without departing from the scope of the invention. For example, as previously described, it should be understood that the meter value and/or the shaper value may be increased instead of decreased when a data packet is read from a queue. Accordingly, it is intended that all matter contained in the above description and shown in the accompanying drawings shall be interpreted as illustrative and not in a limiting sense.

The invention claimed is:

1. A method for a traffic manager to manage traffic in a network, wherein the traffic manager comprises a hierarchical scheduler, a plurality of queues, and a plurality of scheduling nodes, the method comprising:
   reading a first data packet from a first queue of the plurality of queues based on a scheduling priority of the first queue, wherein the scheduling priority corresponds to a priority at which data packets in respective queues are processed, and wherein the scheduling priority of the first queue is based on:
      a configured priority of the first queue, wherein the configured priority corresponds to a predetermined priority assigned to the first queue;
      a value of a first meter configured to track an amount of data in the first queue; and
      a value of a second meter configured to track an amount of data in a first scheduling node of the plurality of scheduling nodes, the first scheduling node being a parent node of the first queue; and
   propagating the scheduling priority of the first queue to the first scheduling node;
   selectively changing a scheduling priority of the first scheduling node based on (i) a predetermined priority if the first scheduling node is not assigned a dynamic priority, and (ii) the scheduling priority of the first queue propagated to the first scheduling node if the first scheduling node is assigned the dynamic priority, wherein the dynamic priority indicates that the scheduling priority of the first scheduling node is changeable in accordance with the propagated priority; and
   reading the first data packet from the first scheduling node based on the changed scheduling priority of the first scheduling node.

2. A method according to claim 1, further comprising using the first meter and the second meter to dynamically change respective priority levels of the first queue and the first scheduling node between:
   a high priority level when the value of the first meter and the value of the second meter are equal to or higher than a first limit value and a second limit value, respectively, and
   a low priority level when the value of the first meter and the value of the second meter are lower than the first limit value and the second limit value, respectively.

3. A method according to claim 1, further comprising:
   decreasing the value of the first meter and the value of the second meter according to an amount of bits of the first data packet if the first data packet is read from the first queue; and
   periodically increasing the value of the first meter and the value of the second meter by a meter value amount.

4. A method according to claim 1, further comprising using the first meter and the second meter to dynamically change respective priority levels of the first queue and the first scheduling node between:
   a low priority level when the value of the first meter and the value of the second meter are higher than a first limit value and a second limit value, respectively, and
   a high priority level when the value of the first meter and the value of the second meter are equal to or less than the first limit value and the second limit value.

5. A method according to claim 4, further comprising:
   increasing the value of the first meter and the value of the second meter according to an amount of bits of the first data packet if the first data packet is read from the first queue; and
   periodically decreasing the value of the first meter and the value of the second meter by a meter value amount.

6. A method according to claim 1, further comprising reading the first data packet based on:
   a first shaper value of a first shaper associated with the first queue; and
   a second shaper value of a second shaper associated with the first scheduling node.

7. A method according to claim 6, further comprising:
   decreasing the first shaper value and the second shaper value according to an amount of bits of the first data packet if the first data packet is read from the first queue; and
   periodically increasing the first shaper value and the second shaper value by a shaper value amount.

8. A method according to claim 6, further comprising:
   increasing the first shaper value and the second shaper value according to an amount of bits of the first data packet if the first data packet is read from the first queue; and
   periodically decreasing the first shaper value and the second shaper value.

9. A traffic manager, comprising:
   a hierarchical scheduler;
   a plurality of queues; and
   a plurality of scheduling nodes, the traffic manager being configured to read a first data packet from a first queue of the plurality of queues based on a scheduling priority of the first queue, wherein the scheduling priority corresponds to a priority at which data packets in respective queues are processed, and wherein the scheduling priority is based on:
      a configured priority of the first queue, wherein the configured priority corresponds to a predetermined priority assigned to the first queue;
      a value of a first meter configured to track an amount of data in the first queue; and
      a value of a second meter configured to track an amount of data in a first scheduling node of the plurality of scheduling nodes, the first scheduling node being a parent node of the first queue,
   wherein the first queue is configured to propagate the scheduling priority of the first queue to the first scheduling node, and
   wherein the first scheduling node is configured to selectively change a scheduling priority of the first scheduling node based on (i) a predetermined priority if the first scheduling node is not assigned a dynamic priority, and (ii) the scheduling priority of the first queue propagated to the first scheduling node if the first scheduling node is assigned a dynamic priority, wherein the dynamic priority indicates that the scheduling priority of the first scheduling node is changeable in accordance with the propagated priority.

10. A traffic manager according to claim 9, wherein the first meter and the second meter are configured to dynamically change respective priority levels of the first queue and the first scheduling node between:
   a high priority level when the value of the first meter and the value of the second meter are equal to or higher than a first limit value and a second limit value, respectively, and
   a low priority level when the value of the first meter and the value of the second meter are lower than the first limit value and the second limit value, respectively.

11. A traffic manager according to claim 10, further being configured to:
   decrease the value of the first meter and the value of the second meter according to an amount of bits of the first data packet if the first data packet is read from the first queue; and
   periodically increase the value of the first meter and the value of the second meter.

12. A traffic manager according to claim 9, wherein the first meter and the second meter are configured to dynamically change respective priority levels of the first queue and the first scheduling node between:
   a low priority level when the value of the first meter and the value of the second meter are higher than a first limit value and a second limit value, respectively, and
   a high priority level when the value of the first meter and the value of the second meter are equal to or less than the first limit value and the second limit value, respectively.

13. A traffic manager according claim 12, further being configured to:
   increase the value of the first meter and the value of the second meter according to an amount of bits of the first data packet if the first data packet is read from the first queue; and
   periodically decrease the value of the first meter and the value of the second meter.

14. A traffic manager according to claim 9, further being configured to read the first data packet based on:
   a first shaper value of a first shaper associated with the first queue; and
   a second shaper value of a second shaper associated with the first scheduling node.

15. A traffic manager according to claim 14, further being configured to:
   decrease the first shaper value and the second shaper value according to an amount of bits of the first data packet if the first data packet is read from the first queue; and
   periodically increase the first shaper value and the second shaper value by a shaper value amount.

16. A traffic manager according to claim 14, further being configured to:
   increase the first shaper value and the second shaper value according to an amount of bits of the first data packet if the first data packet is read from the first queue; and
   periodically decrease the first shaper value and the second shaper value by a shaper value amount.

* * * * *